(12) United States Patent
Stafford et al.

(10) Patent No.: US 6,179,554 B1
(45) Date of Patent: Jan. 30, 2001

(54) LOW FRICTION FLUID BEARING AND TURBINE USING SAME

(76) Inventors: Elvin A. Stafford, Rte. 2, Box 2026, Thomasville, AL (US) 36784; Steven R. Stafford, 3033 Oakleigh Cove, Germantown, TN (US) 38138

(*) Notice: Under 35 U.S.C. 154(b), the term of this patent shall be extended for 0 days.

(21) Appl. No.: 09/430,321

(22) Filed: Oct. 29, 1999

(51) Int. Cl.[7] ............... F01D 3/00; F01D 25/16
(52) U.S. Cl. ............. 415/105; 415/107; 415/111; 415/112; 415/113; 415/115; 415/175; 415/180; 415/202; 384/100; 384/121
(58) Field of Search .................... 415/111, 112, 415/113, 104, 105, 107, 90, 115, 116, 117, 110, 80, 175, 180, 202; 416/214 R, 186 R, 204 R, 204 A, 214 A, 97 R; 384/100, 121

(56) References Cited

U.S. PATENT DOCUMENTS

| | | |
|---|---|---|
| 907,843 | 12/1908 | Miller . |
| 2,622,859 * | 12/1952 | Gettins ................................. 415/90 |
| 2,868,500 | 1/1959 | Boulet . |
| 2,920,865 | 1/1960 | Lombard . |
| 3,183,384 * | 5/1965 | Flaherty, Jr. et al. ............. 384/100 |
| 3,322,473 * | 5/1967 | Lebach ............................ 384/121 |
| 3,377,113 * | 4/1968 | Wilson ............................. 384/100 |
| 3,841,786 * | 10/1974 | Florjancic ......................... 415/114 |
| 4,218,177 | 8/1980 | Robel . |
| 4,224,008 * | 9/1980 | Haentjens ......................... 415/112 |
| 4,426,118 | 1/1984 | Mohsin . |
| 4,452,566 | 6/1984 | Kardas . |
| 4,486,105 * | 12/1984 | Miyake et al. .................... 384/121 |
| 4,697,933 | 10/1987 | Morita . |
| 5,073,036 | 12/1991 | Sutton et al. . |
| 5,286,113 | 2/1994 | Post . |
| 5,295,330 | 3/1994 | Hoffman . |
| 5,427,499 * | 6/1995 | Kirby ............................... 415/90 |
| 5,743,655 | 4/1998 | Slavin et al. . |

FOREIGN PATENT DOCUMENTS

803551 * 4/1951 (DE) ............................ 416/186 R

* cited by examiner

Primary Examiner—Christopher Verdier
(74) Attorney, Agent, or Firm—Liell & McNeil

(57) ABSTRACT

A low friction bearing comprises a first element having a first surface. A second element having a second surface is rotatable about a centerline relative to the first element. A flow passage extends radially outward between the first surface and the second surface. The first surface and the second surface are separated by a fluid flow. The two surfaces are complementary and positioned in close proximity. The bearing finds a preferred application in a fluid cooled turbine to create a high temperature, high efficiency turbine.

20 Claims, 5 Drawing Sheets

Fig-4-
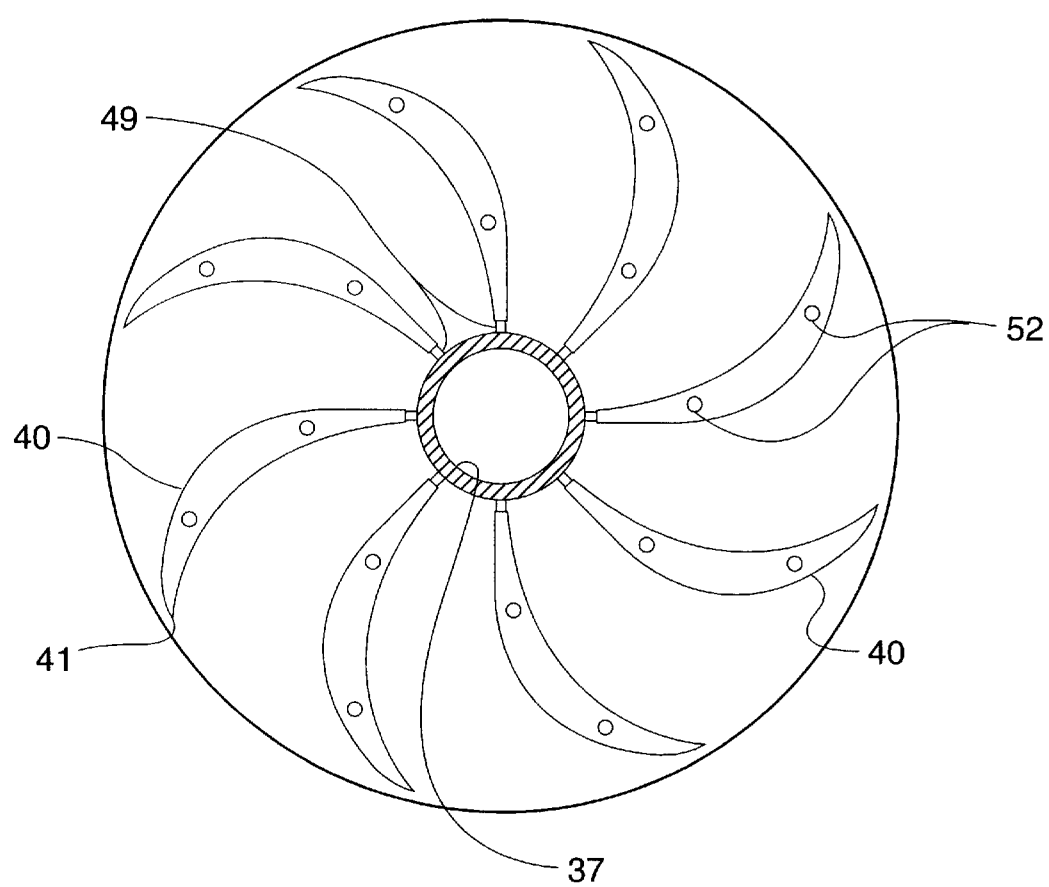

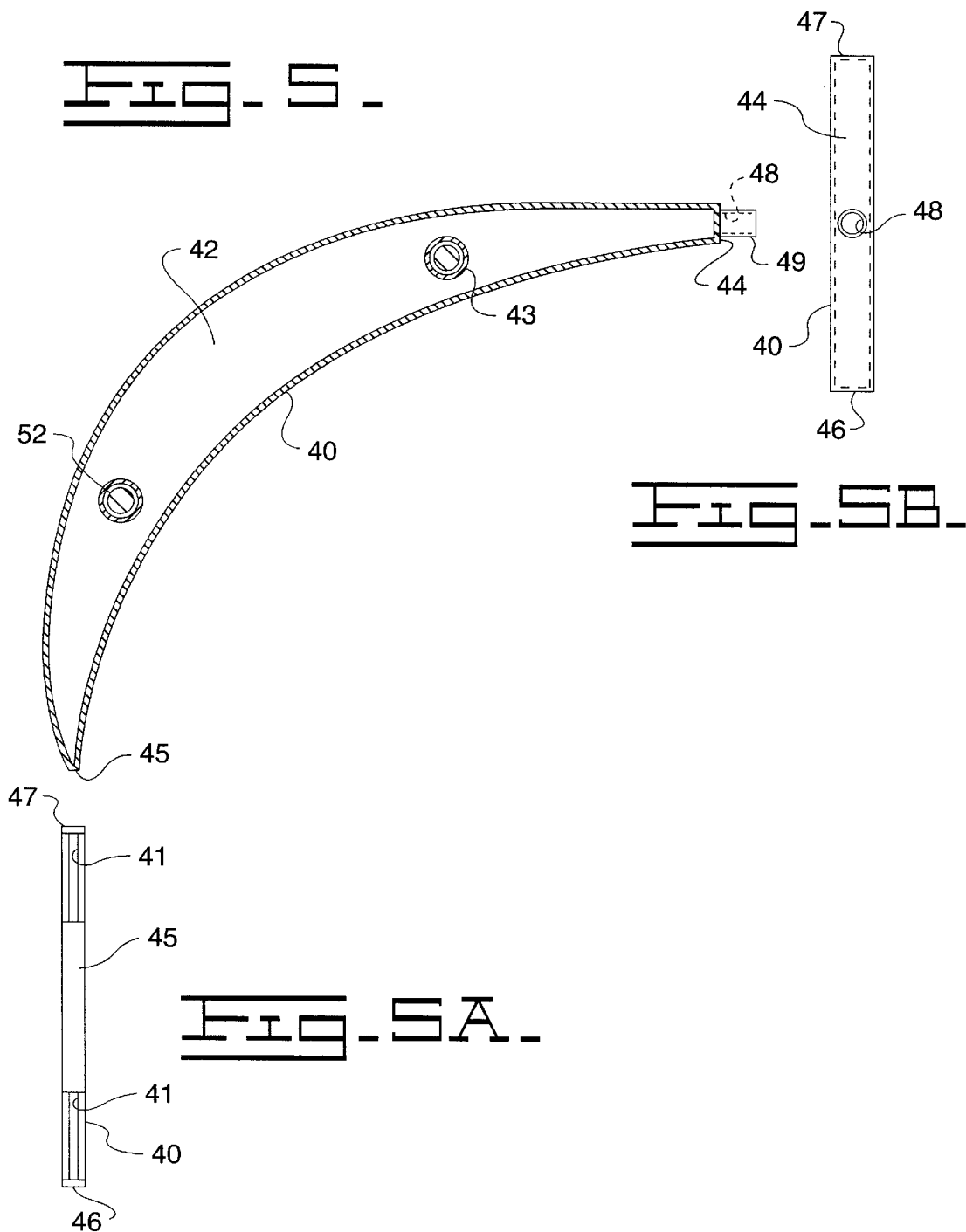

LOW FRICTION FLUID BEARING AND TURBINE USING SAME

TECHNICAL FIELD

The present invention relates generally to low friction fluid bearings, and more particularly to turbines using low friction fluid bearings.

BACKGROUND ART

A variety of rotational devices are dependent upon load supporting bearings for operation. Because traditional bearings include components such as ball bearings, that are almost constantly in motion during device operation, heat caused by friction can build very quickly within the bearing. In addition, the bearing surfaces wear over time, which can further increase heat generation and friction losses. Eventually, almost all bearings fail due to excessive wear and the detrimental effects of heat on the components and lubricants. Because it is desirable to operate most rotational devices at or near their highest rpm level in order to optimize the amount of work produced, it should be appreciated that a bearing exposed to reduced amounts of friction would allow these devices to operate closer to their optimum levels while reducing the likelihood of bearing failure.

In one specific example, turbine engines necessarily include rotating elements that are interconnected to stationary elements via bearings. Because the turbine and bearings are often subjected to relatively high rotation rates and high temperatures, various components must often be constructed from exotic materials, such as ceramics and/or expensive temperature resistant metallic alloys. Because engine efficiency generally increases with both speed and temperature, engineers are constantly seeking ways to operate turbines even faster and at higher temperatures. However, the limitations of available materials place constraints in this area. One response to these constraints have been efforts to introduce cooling circuits into a turbine so that it can be operated at higher temperatures and/or utilize less exotic metallic alloys. However, in order to introduce a cooling fluid circuit into the turbine, there must necessarily be fluid seals that often have a great deal of difficulty withstanding the relatively hot hostile environment within a turbine. Thus, there remain significant problems to overcome in efforts to improve turbine engine efficiency without necessarily seeking ever more exotic and expensive materials.

The present invention is directed to overcoming one or more of the problems set forth above.

DISCLOSURE OF THE INVENTION

A low friction bearing comprises a first element having a first surface. A second element having a second surface is rotatable about a centerline relative to the first element. A flow passage extends radially outward between the first surface and the second surface. The first surface and the second surface are separated by a fluid flow. The two surfaces are complementary and positioned in close proximity.

In one application of the present invention, a turbine comprises a first component that includes a first surface out of contact and adjacent a second component including a second surface. The second component has a plurality of blades and is rotatable about a centerline relative to the first component. A flow passage extends radially outward between the first component and the second component. The first surface and the second surface are complementary and in close proximity. The first surface and the second surface are separated by a fluid flowing in the flow path and a source of fluid is connected to one end of the flow path.

In another application of the present invention, each of the plurality of blades in the turbine described above is hollow and includes a cooling passage. One end of each cooling passage is fluidly connected to the source of fluid.

BRIEF DESCRIPTION OF THE DRAWINGS

FIG. 4 is a sectioned view of the turbine blade of FIG. 3 as viewed along section lines 4—4.

FIG. 5 is a top view of one of the turning blades from FIG. 4.

FIG. 5a is a view of the front edge of the turbine blade from FIG. 5.

FIG. 5b is a view of the rear edge of the turbine blade from FIG. 5.

BEST MODE FOR CARRYING OUT THE INVENTION

Figure 1:
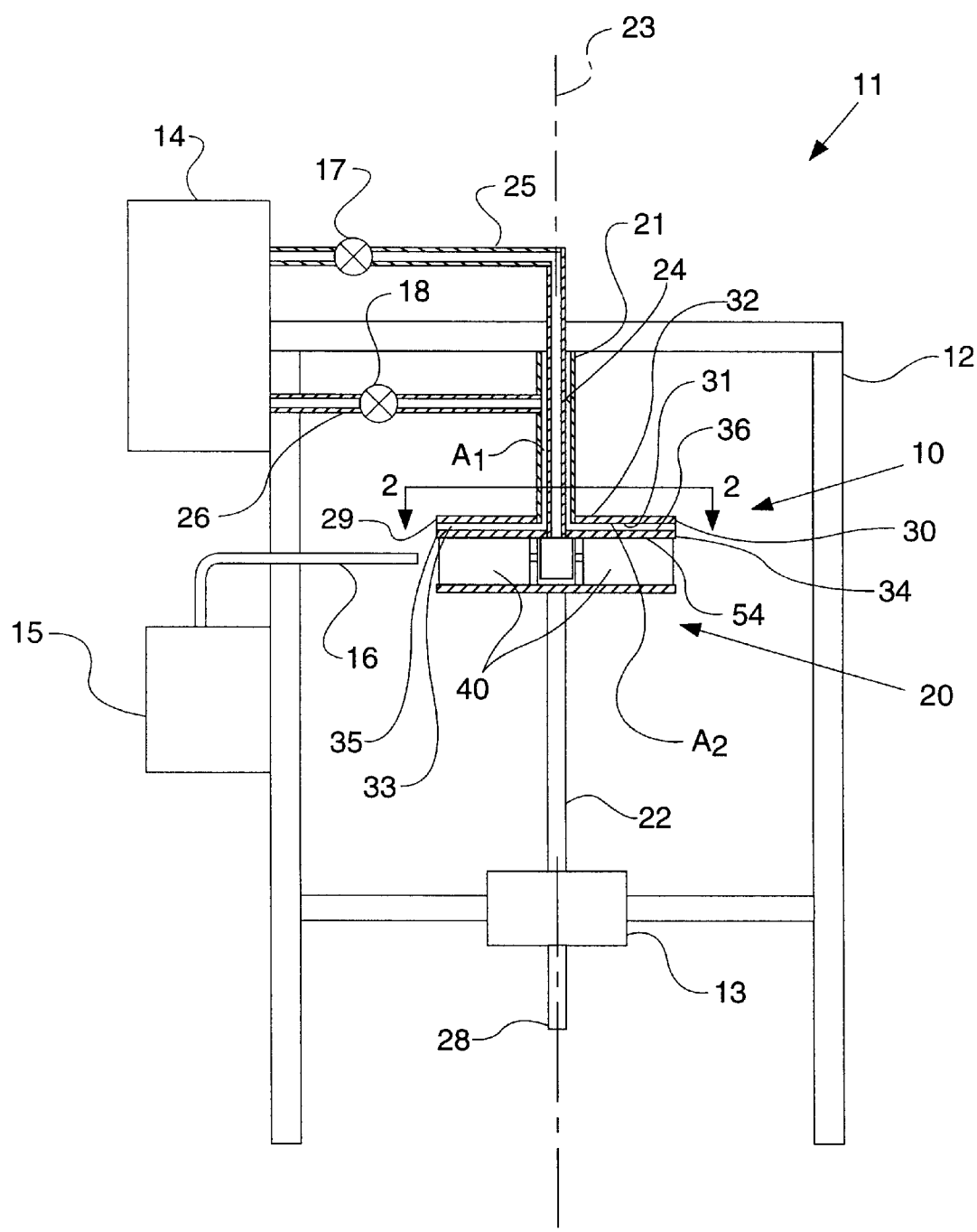
FIG. 1 is a schematic representation of a mechanical system according to the present invention.

Referring now to FIG. 1 there is shown a schematic representation of a mechanical system 11 according to the present invention. Mechanical system 11 includes a mechanical device 20, which is preferably a turbine engine, but could be virtually any machine having rotating elements. Turbine 20 is comprised of a number of components that are mounted on at least one of a stationary hollow shaft 21 and a rotatable shaft 22, and supported by a frame or housing 12. In this example, turbine 20 is a radial turbine that is driven to rotate in a conventional manner by pressurized gas that is from a source of pressurized gas 15 that is directed onto the surface of the turbine blades via a high pressure supply line 16 in a conventional manner. Those skilled in the art will appreciate that the principles of the present invention are equally applicable to axial turbines and like devices. Turbine 20 includes a low friction bearing 10 and a cooling circuit that preferably use a common source of fluid 14, which is preferably a liquid such as water. Fluid source 14 is preferably maintained at a relatively high pressure so that further control over the device can be gained by controlling the respective pressures used to operate the respective low friction fluid bearing 10 and the turbine cooling circuit.

Low friction bearing 10 includes a first component 29 that is a stationary member, or a stator 30. Stator 30 is mounted on hollow shaft 21 and supported by frame 12. Stator 30 includes a a first interior surface, first surface 31 that is adjacent a second interior surface, second surface 36, of a second component 34. First component 29 and second component 34 preferably have circular perimeters and share a common centerline 23. Additionally, while first component 29 and second component 34 are preferably planar surfaces, it should be appreciated that other complementary geometrical configurations would work equally well. For instance, first component 29 and second component 34 could be other complementary surfaces such as convex or concave hemispheres. In other words, the shape and dimensions of first surface 31 and second surface 36 should be such that they are nested together. While the two surfaces are preferably almost identical, they need only have the ability to be positioned in close proximity. However, first surface 31 and second surface 36 must be shaped such that second component 34 can rotate relative to first component 29 about centerline 23.

Second component 34 is mounted on a rotating shaft 22 and supported by frame 12 via a journal bearing 13, or other conventional means, such that it is in close proximity to first component 29 yet preferably prevented from contact with the same. In the illustrated embodiment, a power take off 28 could be located under journal bearing 13. While low friction bearing 10 could function well over a range of distances between first component 29 and second component 34 if the proper pressure and flow conditions can be created, these flow conditions are easier to create when the components are in close proximity. Preferably, frame 12 and journal bearing 13 prevent the first component 29 and second component 34 from contact. Both second component 34 and rotating shaft 22 are capable of rotating about centerline 23 relative to stator 30 when turbine 20 is operational. In addition, while first component 29 and second component 34 have each been illustrated as being machined from single elements, it should be appreciated that either or both of these components could be machined from multiple elements that are attached to one another such that each functions as a separate single component.

Returning now to low friction bearing 10, hollow shaft 21 defines a fluid passage 24 that can fluidly connect source of fluid 14 to a control area 33 between first surface 31 and second surface 26 to create a interaction fluid circuit. When fluid flows through fluid passage 24, a flow passage is created in control area 33 that extends radially outward from centerline 23. In order to allow first component 29 and second component 34 to function as a low friction fluid bearing, the present invention exploits the Bernoulli effect to create a relatively low pressure area within control area 33. In other words, the pressure force on second surface 36 within control area 33 is decreased to below an environmental pressure force acting on a second external surface 54 of second component 34. The fluid bearing is controlled via a interaction circuit valve 18 located in interaction fluid circuit 26 in order to control both fluid pressure and flow rate in the control area 33.

Bernoulli's principle is represented by the equation:

$$P_1 + \tfrac{1}{2}\rho v_1^2 = P_2 + \tfrac{1}{2}\rho v_2^2 \qquad (1)$$

where $P_n$ is static pressure of the fluid at point n and $\tfrac{1}{2}\rho v_n^2$ is the dynamic pressure at point n. The Bernoulli effect is a result of the conservation of energy equating the total mechanical energy at point 1 to the total mechanical energy at point 2. However, it should be appreciated that this equation is only approximate because it ignores such factors as friction losses, temperature variation, viscosity, density variation and others. In addition, the equation of continuity states that for an ideal, incompressible fluid flowing in a flow path of varying cross-section, the mass flow rate is the same at all points along the flow path. The equation of continuity can be represented by the following equation:

$$\rho_1 A_1 v_1 = \rho_2 A_2 v_2 \qquad (2)$$

where $\rho$ is the density, A is the cross-sectional area and v is the velocity of the fluid. For illustrative purposes, assuming an ideal, constant density fluid, equation (2) can be reduced to:

$$A_1 v_1 = A_2 v_2 \qquad (3)$$

It should be appreciated that, assuming the distance between the plates to be constant, the velocity of the fluid drops as if flows out from the center. This occurs in the case of the illustrated embodiment because the flow area increases with the radial distance away from centerline 23, which must result in a corresponding velocity drop in order to satisfy the continuity equation.

Further, if the fluid velocity in fluid passage 24 is assumed to be very low, or negligible, equation (1) can be reduced to:

$$P_1 = P_2 + \tfrac{1}{2}\rho v_2^2 \qquad (4)$$

Equations (3) and (4) are useful in showing that the velocity drops as the flow moves away from the center in control area 33, and the static pressure increases correspondingly.

Returning now to FIG. 1, low friction bearing 10 will only function as desired when the flow conditions within control area 33 are such that first component 29 and second component 34 interact. In other words, when the net pressure force acting on journal bearing 13 is an upward force, second component 34 is said to be interacting with first component 29. In order for the first component 29 and second component 34 to be considered interacting in the sense of the present invention, the net pressure force acting on second component 34 must at least partially counteract its constant downward weight force. Thus, the low friction bearing 10 of the present invention not only acts as a substitute for a conventional bearing, but also can be used to relieve potentially detrimental axial forces acting on the other bearing, which in this case is journal bearing 13.

Recall that the pressure acting on second surface 36 is not constant, but increases as the flow moves away from centerline 23. Therefore, the net force acting on second surface 36 must be determined by integrating the pressure at each point along the flow path. For simplicity, the pressure acting upward on second external surface 54 can be assumed to be a constant atmospheric pressure. In a practical application, this external pressure would correspond to a pressure within a casing containing the turbine device. The external pressure force acting on second component 34 can then be reduced to an upward acting external pressure force equal to the environmental pressure exposed to second external surface 54 multiplied by the area of second surface 36, which is about equal to the effective area of second external surface 54. The downward acting pressure force within control area 33 is equal to the pressure within control area 33 multiplied by the area of second surface 36. The downward acting weight force equal to W is assumed to be constant. Therefore, the relation of forces acting on journal bearing 13 can be reduced to:

$$-W - \int_0^R 2\pi r d\, P_c dr + \pi R^2 P_e = F_{net} \qquad (5)$$

where W is the weight of second component 34, $2\pi r d\, P_e\, dr$ is the force acting against second surface 36, and $\pi R^2 P_e$ is the upward pressure force acting on second external surface 54, assumed to be a constant force for purposes of this illustration, and R corresponds to the radius of second surface 36. Recall that the net pressure acting on second surface 36 of second component 34 is a function of velocity of the fluid in control area 33. Therefore, it should be appreciated that the flow conditions within low friction bearing 10 must be such that the net pressure force acting down on second surface 36 must be less that the net atmospheric force acting upward on second external surface 54. In other words, control area 33 must be a low pressure area relative to the environmental pressure acting on second external surface 54. Preferably, the net upward pressure force on second component 34 is about equal, such that rotating shaft 22 "floats" in journal bearing 13 in a way that it no longer needs to support the weight of the components positioned above it.

It should be appreciated that Bernoulli's equation (1) assumes an incompressible ideal, or frictionless liquid. In other words, adjustments might need to be made for friction, changes in density, and unsteady flows etc., in order to use the equations to make accurate quantitative predictions. For example, if first surface 31 and second surface 36 are rough surfaces, the fluid flowing through control area 33 would become turbulent, and equation (1) would need to be adjusted correspondingly if a more accurate quantitative answer was desired.

In addition, it should be appreciated that the present invention will only function as desired in an environment where there is at least some measurable pressure force acting on second external surface 54. In other words, first component 29 and second component 34 could not be interacting using the present invention in a vacuum. This is true because the components of low friction bearing 10 will only be interacting when the pressure force acting downward on second surface 36 is less than the environmental pressure force acting upward on second external surface 54. Because it would be impossible to reduce the pressure within control area 33 to below zero, second component 34 could not be drawn toward first component 29 in that instance. Further, for purposes of this disclosure, the environmental pressure acting on second external surface 54 is assumed to be atmospheric pressure at sea level. However, it should be appreciated that the present invention would also work if the pressure was much greater, such as at some point below sea level, or at low pressures, such as at high altitudes. In either instance, the velocity of the fluid and its corresponding static pressure within control area 33 must be adjusted depending upon the external pressure forces acting on the turbine.

Figure 2:
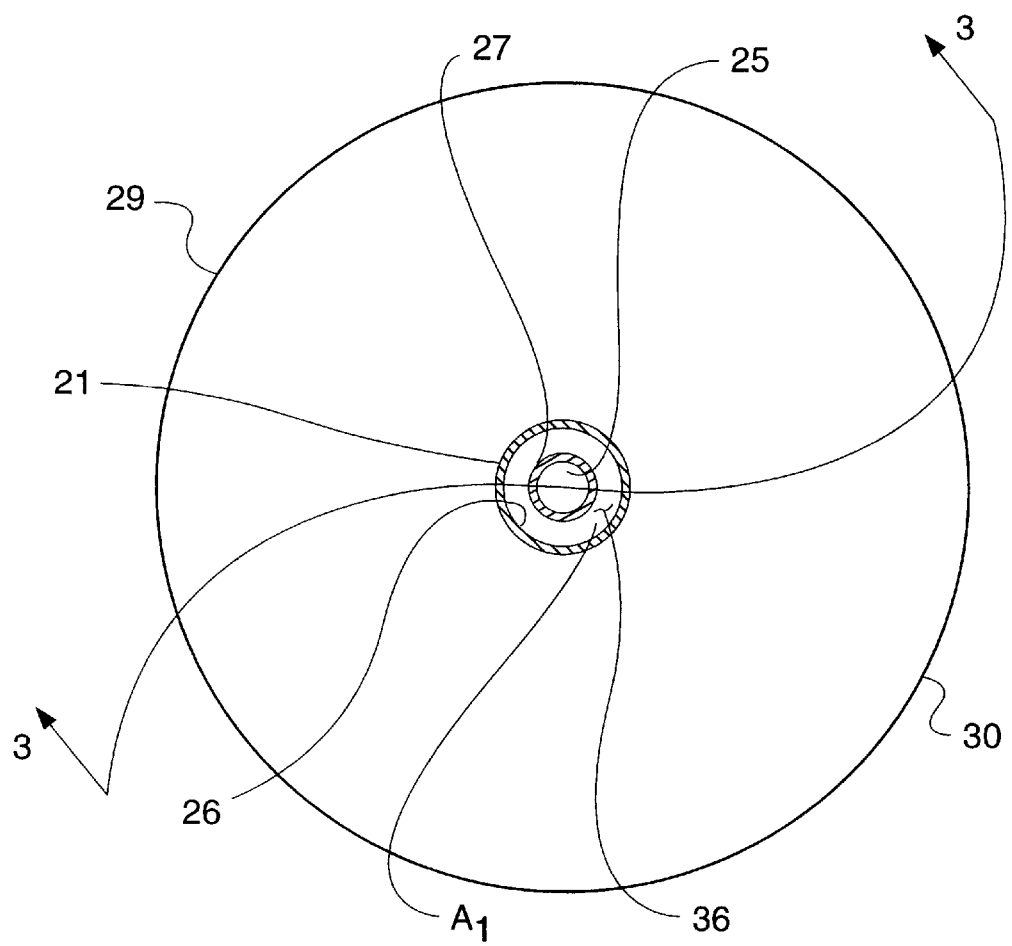
FIG. 2 is a sectioned top view of the mechanical system of FIG. 1 as viewed along section lines 2—2.
Figure 3:
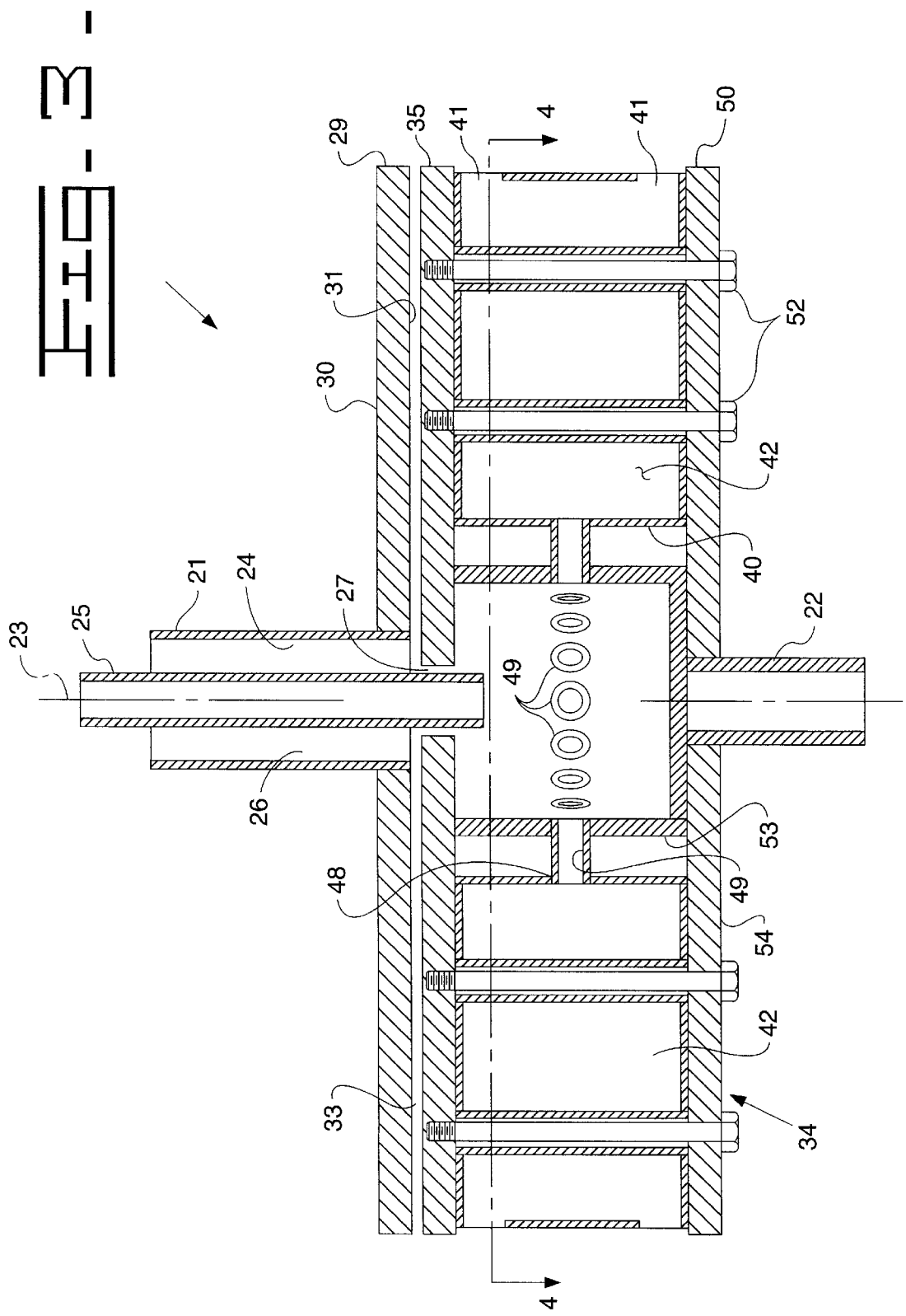
FIG. 3 is a sectioned side view of the turbine of FIG. 2 as viewed along section lines 3—3.

Referring now to FIGS. 2 and 3, turbine 20 is driven to rotate in any conventional manner such as by pressurized gas from a source 15. In this aspect of the present invention, low friction bearing 10 includes stator 30, which is once again shown as being machined from a single element. Stator 30 is mounted on hollow shaft 21 and includes a first surface 31 that is adjacent a second component 34. Second component 34 is mounted on rotating shaft 22 and supported by a frame such that it is in close proximity to first component 29 yet prevented from contact with the same. Second component 34 is comprised of a plurality of elements including a pair of rotating plates 35, 50 that are separated by a plurality of turbine blades 40. Rotating plate 35 includes a second surface 36 that is adjacent first surface 31. While any conventional method of attachment would work, rotating plates 35, 50 and each turbine blade 40 have been illustrated as being secured together by a number of bolts 52. While second component 34 has been illustrated utilizing two bolts 52 to secure each turbine blade 40 to rotating plates 35 and 50, it should be appreciated that a different number of bolts and/or any suitable attachment means, such as welding, could be used.

Referring again to FIGS. 1–3, the fluid cooling circuit includes a cooling fluid circuit 25 that has on end connected to fluid source 14 and its other end positioned within a fluid distributor 53, which is centrally located within turbine 20. Although the cooling circuit preferably uses the same fluid as that of the interaction fluid circuit, the fluid flow through the two different circuits can be independently controlled via cooling circuit valve 17 and interaction circuit valve 18, respectively. The advantage of using the same fluid in both the interaction and cooling circuits allows the possibility of eliminating any fluid seals between these two circuits. In the preferred embodiment, some fluid exchange can occur between the interaction fluid circuit 26 and the cooling fluid circuit 25 via a clearance area 27 that exists between the outer diameter of the cooling fluid circuit 25 and the inner diameter of a central bore through rotating plate 35. Those skilled in the art will appreciate that in order to independently control the two fluid circuits, the amount of fluid flow permitted to pass between the fluid circuits via clearance area 27 should be minimized. Upon reaching fluid distributor 53, the cooling fluid flows radially outward through cooling passages 49 that are connected to individual hollow interiors 42 of turbine blades 40. Individual turbine blades 40 define fluid outlets 41 on the outer radial edge of turbine 20. While the cooling fluid and the bearing or interaction fluid have both been shown as flowing through flow passage 24, it should be appreciated that this need not be the case. For instance, the cooling fluid could be delivered to fluid distributor 53 via a separate passage, and fluid distributor 53 could be blocked from fluid communication with fluid passage 24.

Referring now in addition to FIGS. 4–5b, there are shown a variety of views of turbine blades 40. As illustrated in FIG. 5, the interior of turbine blade 40 is hollow, with the exception of a pair of bolt sleeves 43, through which bolts 52 are secured. Turbine blade 40 includes a bottom surface 46 and a top surface 47 to which bolt sleeves 43 are attached in a conventional manner, such as by welding. This construction insures against fluid leakage where the upper and lower surfaces of turbine blade 40 come in contact with the inner surfaces of respective rotating plates 35 and 50. Each turbine blade 40 includes a rear edge 44 that defines an inlet 48.

A cooling passage 49 (FIG. 3) fluidly connects turbine blade 40 to fluid distributor 53 via inlet 48. Therefore, when fluid passage 24 is fluidly connected to a source of pressurized fluid 14 via cooling fluid circuit 25, turbine blade 40 is in fluid communication with the same via cooling passage 49 and inlet 48 because turbine blade 40 is hollow, except for bolt sleeves 43, fluid can flow from rear edge 44 toward front edge 45 and exit turbine blade 40 through a pair of fluid outlets 41. In addition to this cooling function, the cooling flow can torque the turbine to rotate in the same direction as the external forces to reduce losses associated with cooling. Thus, by arranging a cooling circuit as illustrated, the passage of cooling fluid through the turbine actually produces a slight torque in the desired rotational direction of the turbine. Thus, a cooling circuit according to the present invention can decrease energy losses and improve efficiency in the overall operation of the turbine that might not otherwise be possible with cooling strategies associated with prior art devices.

Each turbine blade 40 is preferably constructed by taking a piece of sheet metal and bending it into the air foil shape as shown and providing a central weld at the rear edge 45 as shown in FIG. 5. Next, top and bottom plates having the same air foil shape are welded or otherwise attached at their perimeter to the respective top and bottom of the sheet metal air foil shape. Next, sleeves are incorporated between the end caps and a relatively short cooling passage 49 is attached to the front edge of each blade. The result being an individual turbine blade with a hollow interior that is isolated from the outside except for centrally located fluid inlet 48 and a radially outward located fluid outlet 41. The structure also permits attachment between plates 35 and 50 without concern for possible fluid leakage at the abutment between the upper and lower surfaces of the turbine blades and those plates.

System Operation

Referring now to FIG. 3, just prior to activation of turbine 20, no fluid is flowing through either the interaction fluid circuit or the cooling fluid circuit, and second component 34 is at rest. To initiate the interaction of components within low friction bearing 10, fluid source 14 is placed in fluid communication with fluid passage 24 by opening interaction circuit valve 18. As fluid flows into control area 33, it begins to flow radially outward over second component 34. Once the pressure force acting on second surface 36 drops below the environmental force acting on second external surface 54, second component 34 is interacting with first component 29. When the net pressure force acting on journal bearing 13 is upward, first component 29 and second component 34 are interacting. The desired operating condition is where the net pressure force is about equal to the weight of second component 34 such that journal bearing 13 does not have to support the weight of second component 34. Those skilled in the art will appreciate that with appropriate flow conditions between components 29 and 34, the net pressure force can actually exceed the weight of the second component 34 such that it is actually pulled or drawn toward first component 29. For this purpose, the journal bearing is preferably positioned such that the two components are mechanically constrained from coming in contact with one another.

After the requisite flow conditions have been created to allow the first component to interact with the second component, the cooling circuit can be initiated. This is accomplished by opening cooling circuit valve 17 to begin fluid flow to the interior of the turbine blades 40. Because of the torque produced on the turbine due to the structure of the cooling circuit, the turbine will begin to rotate. Next, the high pressure line 16 from the high pressure gas source is opened in order to drive the turbine to rotate.

The present invention creates a low friction fluid bearing by creating a relatively low pressure area between a stationary component and a rotating component when a fluid is introduced between the same. Thus by controlling flow conditions such as distance between the components, velocity of the fluid, etc., a net positive upward pressure force acting on the rotating component can be created to allow it to interact with the stationary member. Therefore, when the rotating component is at least partially lifted toward the stationary component as a result of this interaction, the journal bearing supporting the second component is relieved of some or all of the weight load that it would ordinarily bear. Additionally, the fluid is less resistive to relative motion, i.e. rotation, than some intervening bearing, such as a ball bearing. In other words, by simultaneously reducing the load on the journal bearing 13 and by having a very low friction bearing via the low friction fluid bearing 10, substantial friction losses in turbine 20 can be reduced relative to its conventional bearing counterparts.

Not only does the present invention create a bearing that is exposed to lower friction than traditional bearing, it can also extend the life of other bearing being used in the same mechanical device or system. For instance, in a turbine having a first component and a second component each supported by conventional bearings, the present invention can eliminate one bearing and reduce the load supported by the other bearing, thereby helping to extend the life of the remaining bearing. In that instance, when the pressure force exerted on the components is a positive, upward force, the first and second components will be interacting, and therefore, an amount of the weight that would otherwise be supported by the lower bearing will be reduced.

It is believed that turbine engines having a structure with both a cooling and interaction fluid circuit of the type previously described can produce overall engine efficiencies that could exceed 70 percent. In any event, by utilizing the fluid interaction circuit of the present invention to produce a low friction fluid bearing, the overall friction on a system can be significantly reduced and thus increase its efficiency. By also incorporating a fluid cooling circuit into the system, a turbine could be operated at significantly higher temperatures than that possible with conventional non-cooled devices, which would normally result in a substantial increase in efficiency in proportion to the increased operating temperature. Finally, by using the same fluids in both the fluid interaction and the fluid cooling circuits, any potentially problematic fluid seals can be eliminated from the system thus providing not only a more efficient turbine engine but a more robust one as well. The present invention also makes it possible to use less exotic materials in a turbine engine without otherwise sacrificing on performance.

It should be understood that the above description is intended for illustrative purposes only, and is not intended to limit the scope of the present invention in any way. For instance, while the source of fluid has been illustrated as being fluidly connected to the hollow shaft, it should be appreciated that it could be fluidly connected to the low friction fluid bearing in any conventional manner that would allow fluid to be channeled radially outward between the first and second components. Further, while the present invention has been illustrated utilizing liquid to separate the rotating component from the stationary component, it should be appreciated that either gas or a combination of liquid and gas could instead be utilized. Additionally, while the stationary component of the present invention has been illustrated as being a single element, it should be appreciated that it could instead be made of two or more pieces attached together to function as a single component. Thus, those skilled in the art will appreciate that various modifications could be made to the disclosed embodiments without departing from the intended scope of the present invention, which is defined in terms of the claims set forth below.

What is claimed is:

1. A low friction bearing comprising:
    a first component having a first interior surface and a first external surface;
    a second component having a second interior surface, a second external surface and being rotatable about a centerline relative to said first component;
    a flow passage extending in all radial directions outward away from said centerline between said first interior surface and said second interior surface;
    said first interior surface and said second interior surface being separated by a first fluid flowing in said flow passage, and said first fluid being a liquid;
    said first external surface and said second external surface being in contact with a second fluid; and
    said second component being drawn toward said first component and at least in part by pressure forces exerted by said first fluid and said second fluid on said first component and said second component.

2. The low friction bearing of claim 1 wherein said first interior surface and said second interior surface are planar.

3. The low friction bearing of claim 1 wherein said first interior surface has a first perimeter and said second interior surface has a second perimeter; and
    said first perimeter and said second perimeter are circular and equal in size.

4. The low friction bearing of claim 1 further comprising a mechanical means for preventing said second component from contacting said first component.

5. The low friction bearing of claim 1 wherein
a static pressure force from said first fluid on said second interior surface is less than an outside pressure force from said second fluid on said second exterior surface of said second component.

6. A turbine comprising:
a first component including a first interior surface and a first external surface, and being out of contact with a second component and adjacent said second component;
said second component including a second interior surface and a second external surface;
said second component having a plurality of turbine blades and being rotatable about a centerline relative to said first component;
a flow passage extending in all radial directions outward away from said centerline between said first component and said second component;
said first interior surface and said second interior surface being separated by a first fluid flowing in said flow passage, and said first fluid being a liquid;
a source of interaction fluid connected to one end of said flow passage;
said first external surface and said second external surface being in contact with a second fluid; and
said second component being drawing toward said first component at least in part by pressure forces exerted by said first fluid and said second fluid on said first component and said second component.

7. The turbine of claim 6 wherein each of said plurality of turbine blades includes a cooling passage; and
one end of said cooling passage is fluidly connected to a source of cooling fluid.

8. The turbine of claim 7 wherein said source of interaction fluid and said source of cooling fluid contain substantially identical liquids.

9. The turbine of claim 6 wherein said first interior surface and said second interior surface are planar.

10. The turbine of claim 6 wherein each of said plurality of turbine blades defines a hollow interior positioned between an inlet and an outlet, and further defines at least one fastener bore isolated from said hollow interior.

11. The turbine of claim 6 further comprising a mechanical means for preventing said second component from contacting said first component.

12. The turbine of claim 6 wherein said first interior surface and said second interior surface are circular and equal in size.

13. The turbine of claim 6 wherein said plurality of turbine blades define a portion of a cooling fluid circuit fluidly connected to said source of interaction fluid.

14. The turbine of claim 6 wherein each of said plurality of turbine blades includes a cooling passage, and one end of said cooling passage is fluidly connected to a source of cooling fluid;
said source of interaction fluid and said source of cooling fluid are fluidly connected to a common fluid source; and
said first interior surface and said second interior surface are circular and planar.

15. A method of providing an interaction between two components comprising:
positioning a first component including a first interior surface in close proximity with a second component including a second interior surface;
rotating said second component relative to said first component;
channeling a first fluid in a flow passage that extends in all radial directions outward between said first interior surface and said second interior surface, wherein said first fluid is a liquid;
exposing a first external surface of said first component and a second external surface of said second component to a second fluid; and
drawing said second component toward said first component, at least in part by pressure forces exerted by said first fluid and said second fluid on said first component and said second component.

16. The method of claim 15 wherein said step of positioning said first component in close proximity with said second component includes mounting said first component on a hollow shaft and mounting said second component on a rotatable shaft;
aligning said hollow shaft and said rotatable shaft along a common centerline of said first component and said second component; and
said channeling step includes a stop of fluidly connecting said hollow shaft to a source of interaction fluid.

17. The method of claim 16 further comprising the step of attaching a plurality of turbine blades to said second component; and
said rotating step includes a step of applying a fluid pressure force to said turbine blades.

18. The method of claim 17 wherein said rotating step includes applying torque to said second component via fluid forces on said turbine blades.

19. The method of claim 18 wherein said step of applying torque to said second component includes channeling an amount of fluid from a source of cooling fluid through said plurality of turbine blades.

20. The method of claim 17 wherein said channeling step includes a stop of routing a portion of said first fluid to a cooling fluid circuit and routing a different portion of said first fluid to an interaction fluid circuit.

* * * * *